(12) United States Patent
Vu et al.

(10) Patent No.: US 10,274,750 B2
(45) Date of Patent: Apr. 30, 2019

(54) PROGRESSIVE MULTIFOCAL CONTACT LENS AND PRODUCING METHOD THEREOF

(71) Applicant: National Taiwan University of Science and Technology, Taipei (TW)

(72) Inventors: Thi-Lien Vu, Taipei (TW);
Chao-Chang Chen, Taipei (TW);
Yu-Ting Qiu, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 116 days.

(21) Appl. No.: 15/432,934

(22) Filed: Feb. 15, 2017

(65) Prior Publication Data
US 2018/0024380 A1    Jan. 25, 2018

(30) Foreign Application Priority Data

Jul. 21, 2016    (TW) .................................. 105123109
Jul. 21, 2016    (TW) .................................. 105211032

(51) Int. Cl.
*G02C 7/02*    (2006.01)
*G02C 7/04*    (2006.01)
*G02C 7/06*    (2006.01)

(52) U.S. Cl.
CPC ............. *G02C 7/044* (2013.01); *G02C 7/028* (2013.01); *G02C 7/042* (2013.01); *G02C 7/068* (2013.01)

(58) Field of Classification Search
CPC .......... G02C 7/04; G02C 7/041; G02C 7/043; G02C 7/045; G02C 7/044; G02C 7/068; G02C 7/028; G02C 7/042
(Continued)

(56) References Cited

U.S. PATENT DOCUMENTS 5,812,236 A * 9/1998 Seidner .................. G02C 7/027
                                                351/159.41
6,030,077 A    2/2000 Sawano et al.
(Continued)

FOREIGN PATENT DOCUMENTS

CN    1708716 A    12/2005
CN    1330980 C    8/2007
(Continued)

OTHER PUBLICATIONS

Wikipedia, NON-uniform rational B-spline, Jul. 4, 2013 (Year: 2013).*

(Continued)

*Primary Examiner* — William R Alexander
*Assistant Examiner* — Henry A Duong
(74) *Attorney, Agent, or Firm* — Mark M. Friedman

(57) ABSTRACT

A progressive multifocal contact lens and producing method thereof are provided. The progressive multifocal contact lens includes a first optical region of a front optical surface and a second optical region of a back optical surface. The first optical region includes a center zone, an outer zone and an intermediate zone connected between the center zone and outer zone where the center zone and outer zone are selected from a distance vision power and a near vision power and the intermediate zone is configured to adjust the optical power of the distance vision power and the near vision power so that the optical power or add power of the first optical region on the front optical surface forms a normal cumulative distribution function.

16 Claims, 8 Drawing Sheets

(58) Field of Classification Search
USPC .................................................. 351/159.06
See application file for complete search history.

(56) References Cited

U.S. PATENT DOCUMENTS

| | | |
|---|---|---|
| 6,709,103 B1 | 3/2004 | Roffman et al. |
| 6,871,953 B1 | 3/2005 | Mandell et al. |
| 2003/0151831 A1 | 8/2003 | Sandstedt et al. |
| 2013/0182215 A1 | 7/2013 | Tung |
| 2014/0049747 A1 | 2/2014 | Altheimer et al. |
| 2015/0316790 A1 | 11/2015 | Chien |
| 2016/0077359 A1* | 3/2016 | Baudart ................ G02C 7/027 351/159.74 |
| 2016/0209677 A1 | 7/2016 | Izawa et al. |
| 2016/0357030 A1* | 12/2016 | Gerligand ............. G02C 7/048 |

FOREIGN PATENT DOCUMENTS

| | | |
|---|---|---|
| CN | 105164684 A | 12/2015 |
| CN | 105556379 A | 5/2016 |
| TW | M484119 U | 8/2014 |
| TW | I497150 B | 8/2015 |
| TW | M533235 U | 12/2016 |

OTHER PUBLICATIONS

Qiao Lihong "Computer Aided Design and Manufacturing", China Machine Press, Oct. 31, 2014.

* cited by examiner

PROGRESSIVE MULTIFOCAL CONTACT LENS AND PRODUCING METHOD THEREOF

BACKGROUND

Field

The present invention relates to a lens and a producing method thereof, and more particularly to a progressive multifocal contact lens and a producing method thereof.

Background

A contact lens is widely used to correct different types of impaired visions including myopia, hyperopia, astigmatism, and a short-distance vision defect related to eyesight degeneration (e.g., presbyopia). The human with presbyopia utilizes a contact lens to correct the defect of a farsightedness. For example, a simultaneous bifocal or multifocal contact lens provides a number of concentric optical regions such as a distance vision for focusing to infinity objects and a near vision for focusing close objects within the area of the pupil of the wearer. Because the light ray from both distance and near objects focus on the retina at the same time, the brain should learn to select either the distance or near image.

However, the simultaneous bifocal contact lens or bifocal concentric lens include many concentric optical rings (i.e., near and distance rings). The refractive power distribution is discrete from center zone to peripheral zone. The ring width and number of rings depends on the human eye's pupil diameter. These reasons will degrade the visual quality. In another design, namely simultaneous multifocal contact lens, one or more intermediate optical zones are added to connect the near and distance optical zones. Thus, the refractive power gradually changes between the near and distance zones. Nevertheless, in some conventional technical schemes, the connection surface between the optical power of distance zone and the optical power of near zone are not smooth, resulting in the interference images of the contact lens of the wearer in these optical zones. Therefore, if the transitions of the lens surfaces corresponding to these zones are not discontinuous, it causes a discontinuity of the power profile. For this reason, the wearing comfort is declined due to the overlapping of the images.

In another conventional technical schemes, to reduce the discontinuity, the surface profile combines various types of the conics curve, which requires at least the second-order geometric continuity at all junctions. It is a complicated problem so that the continuities of center optical zone and power profile of the contact lens are not always achieved. Therefore, there is a need to provide a novel method to solve the above-mentioned problems.

SUMMARY OF THE INVENTION

One objective of the present invention is to provide a progressive multifocal contact lens and a producing method thereof by forming a Non-Uniform Rational B-spline (NURBS) profile on the front side surface and allocating a progressive changeable power to improve the eyesight of the wearer and increase the deign flexibility of the contact lens.

For the above-mentioned objective, the present invention sets forth a progressive multifocal contact lens. The progressive multifocal contact lens includes an optical axis; a front side surface having a first optical region, wherein the optical axis is a center of the first optical region, the first optical region comprises a central zone, an annular zone, and an intermediate zone disposed between the central zone and the annular zone, the central zone and the annular zone comprise different powers having a distance vision power and a near vision power respectively, and the intermediate zone is configured to adjust an optical power of the distance vision power and the near vision power progressively so that a power between the distance vision power and the near vision power in the first optical region of the front side surface forms a continuity normal distribution; and a rear side surface having a second optical region, wherein the optical axis is a center of the second optical region, the rear side surface is disposed opposite the front side surface based on the optical axis, and an edge portion of the front rear side surface is connected to an edge portion of the rear side surface.

In one embodiment, the front side surface further comprises a peripheral zone connected to an outer edge portion of the annular zone and the peripheral zone is either spherical surface or aspheric surface.

In one embodiment, the powers are represented by following formula:

$$P(x) = P_c \pm \text{Add} * \left[ \frac{1}{2} + \frac{1}{\sqrt{\pi}} \int_0^x e^{\frac{(t-\mu)^2}{2\sigma^2}} dt \right]$$

where an average number $\mu$ is represented "$x_c+(W_{im}/2)$", a standard deviation $\sigma$ is represented "$W_{im}/6$", Add is an additional power, x is a radial distance of the first optical region based on the optical axis, $P_c$ is the near vision power of distance vision power of the central zone, $x_c$ is a radius of the central zone, $W_{im}$ is a width of the intermediate zone, t is an integral variable of a length, and an operator "+" represents that the central zone is the distance vision power and an operator "−" represents that the central zone is the near vision power.

In one embodiment, the radius $x_c$ of the central zone is greater than or equal to zero millimeter (mm) and the radius $x_c$ is less than one mm, the width $W_{im}$ of the central zone is greater than zero mm and the width $W_{im}$ is less than or equal to three mm.

In one embodiment, either the central zone is the distance vision power and the annular zone is the near vision power or the central zone is the near vision power and the annular zone is the distance vision power.

In one embodiment, a radius of the central zone, a width of the intermediate zone and an add power of the first optical region are configured to adjust the continuity normal distribution of the powers of the first optical region.

In one embodiment, the central zone, the annular zone, and the intermediate zone of the first optical region are a continuous surface profile of a Non-Uniform Rational B-spline (NURBS).

In one embodiment, the continuous surface profile of NURBS is represented by following formula:

$$C(u) = \frac{\sum_{i=0}^{h} N_{i,p}(u) w_i P_i}{\sum_{i=0}^{h} N_{i,p}(u) w_i}$$

where $P_i$ is i-th control point of total (h+1) control points, $w_i$ is i-th weighting value, $N_{i,p}(u)$ is i-th B-spline basis function of parameter u and degree p.

In one embodiment, each connection point of the central zone and the intermediate zone of the first optical region comprises the same slope value, and each connection point of the intermediate zone and the annular zone comprises the same slope value.

In one embodiment, the present invention sets forth a method of producing a progressive multifocal contact lens. The method includes the steps of: providing an optical axis to a main body; forming a front side surface having a first optical region, wherein the optical axis is a center of the first optical region, the first optical region near the optical axis comprises a central zone, an annular zone, and an intermediate zone disposed between the central zone and the annular zone, the central zone and the annular zone comprise different powers having a distance vision power and a near vision power respectively; adjusting the intermediate zone to change an optical power of the distance vision power and the near vision power progressively so that a power between the distance vision power and the near vision power in the first optical region of the front side surface forms a continuity normal distribution; and forming a rear side surface having a second optical region, wherein the optical axis is a center of the second optical region, the rear side surface is disposed opposite the front side surface based on the optical axis, and an edge portion of the front rear side surface is connected to an edge portion of the rear side surface.

DETAILED DESCRIPTION OF THE PREFERRED EMBODIMENTS

The following embodiments refer to the accompanying drawings for exemplifying specific implementable embodiments of the present invention. It should be noted that the exemplary described embodiments are configured to describe and understand the present invention, but the present invention is not limited thereto.

Figure 1:
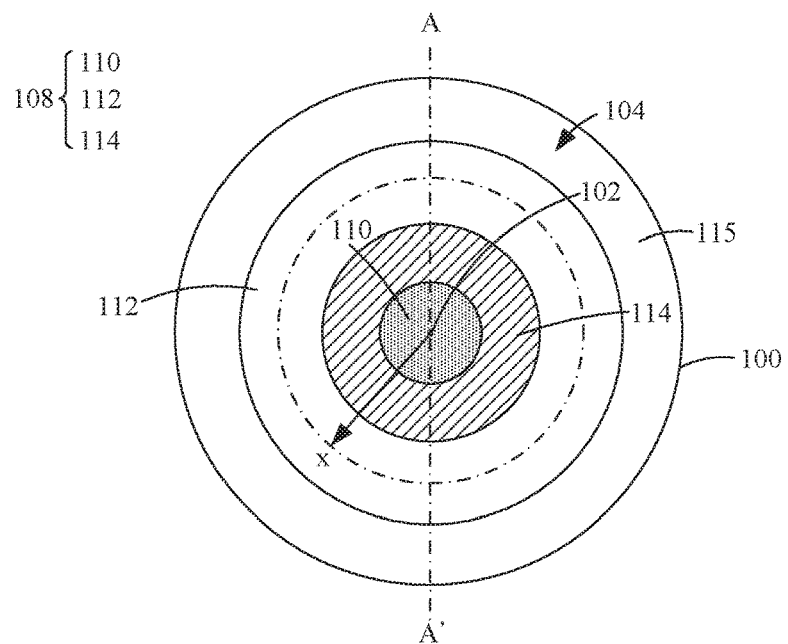
FIG. 1 is a schematic top view of a progressive multifocal contact lens according to one embodiment of the present invention.
Figure 2:
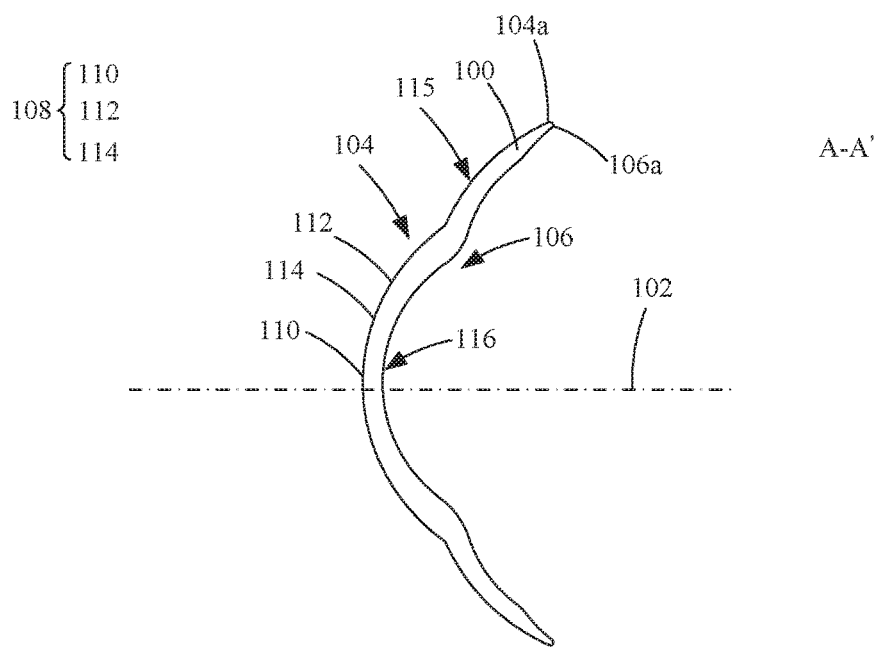
FIG. 2 is a schematic cross-sectional view of the progressive multifocal contact lens along a line A-A' of FIG. 1 according to one embodiment of the present invention.

FIG. 1 is a schematic top view of a progressive multifocal contact lens according to one embodiment of the present invention. FIG. 2 is a schematic cross-sectional view of the progressive multifocal contact lens along a line A-A' of FIG. 1 according to one embodiment of the present invention. In FIG. 1 and FIG. 2, the progressive multifocal contact lens includes a main body 100, an optical axial 102, a front side surface 104, and a rear side surface 106. The optical axis 102 passes the main body 100, the front side surface 104, and the rear side surface 106. The optical axis 102 is a central axis line of the progressive multifocal contact lens. In one embodiment, the optical axis 102 is either axial symmetry or non-axisymmetric. For example, the optical axis 102 is axial symmetry in FIG. 2. The front side surface 104 and the rear side surface 106 are disposed the opposites sides of the main body 100 and the front side surface 104 and the rear side surface 106 are connected to an edge portion of main body 100. In other words, the edge portion 104a of the front side surface 104 is connected to the edge portion 106a of the rear side surface 106.

In FIG. 1 and FIG. 2, the front side surface 104 includes a first optical region 108, where the optical axis 102 is a center of the first optical region 108. The first optical region 108 near the optical axis 102 includes a central zone 110, an annular zone 112, and an intermediate zone 114 disposed between the central zone 110 and the annular zone 112, the central zone 110 and the annular zone 112 include different powers having a distance vision power and a near vision power respectively, and the intermediate zone 114 is configured to adjust an optical power of the distance vision power and the near vision power progressively so that a power between the distance vision power and the near vision power in the first optical region 108 of the front side surface 104 forms a continuity normal distribution. In one embodiment, the central zone 110 is a distance vision power and the annular zone 112 is a near vision power. In another case, the central zone 110 is a near vision power and the annular zone 112 is a distance vision power. In one embodiment, the first optical region 108 of the front side surface 104 corresponds to the pupil (not shown) of the eye of the wearer along the optical axis 102. The front side surface 104 further includes a peripheral zone 115 connected to an outer edge portion of the annular zone 112 and the peripheral zone 115 is either a spherical surface or an aspheric surface.

As shown in FIG. 1 and FIG. 2, the rear side surface 106 includes a second optical region 116, where the optical axis 102 is a center of the second optical region 116. In one embodiment, the rear side surface 106 and the second optical region 116 are either spherical surfaces or aspheric surfaces. The second optical region 116 of the rear side surface 106 contacts the pupil (not shown) of the eye of the wearer.

Figure 3:
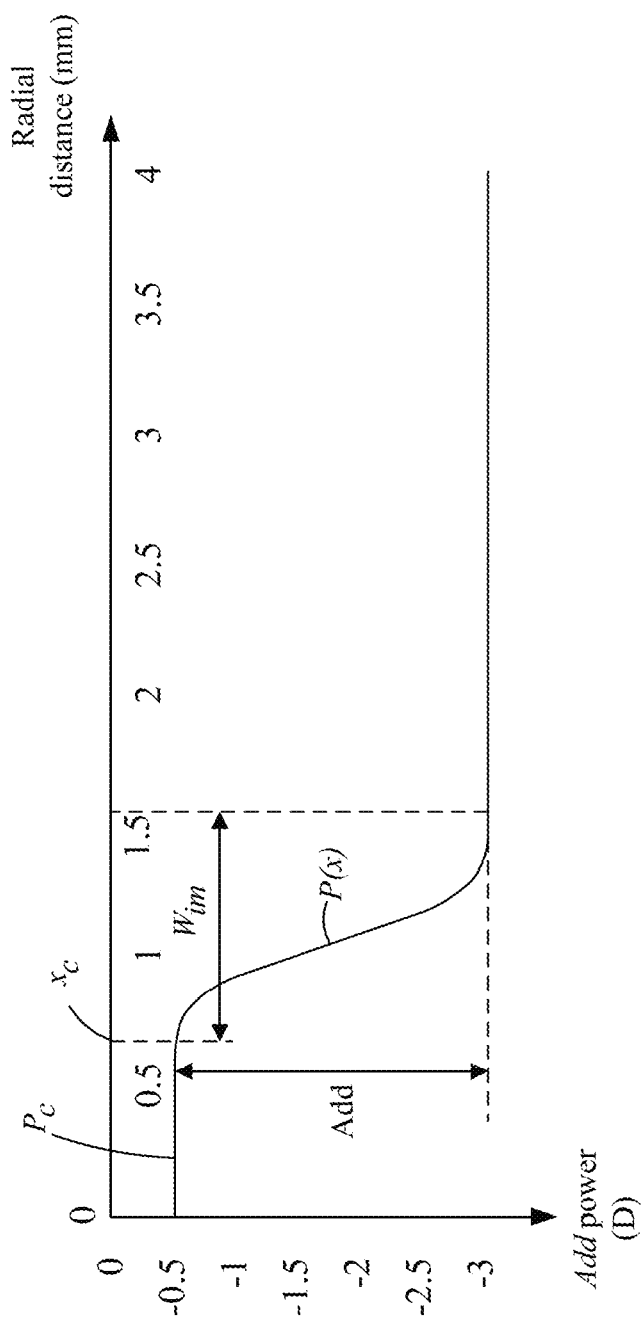
FIG. 3 is a schematic view of a power curve of the progressive multifocal contact lens according to one embodiment of the present invention.

FIG. 3 is a schematic view of a power curve of the progressive multifocal contact lens according to one embodiment of the present invention. A horizontal axis is defined as x which is a radial distance of the first optical region 108 from the optical axis 102 and has the unit of millimeter (mm). A vertical axis is defined as an add power which has the unit of D (diopters). The power in the present invention is defined by using normal cumulative distribution function. As shown in FIG. 3, the powers are represented by following formula:

$$(x) = P_c \pm \text{Add} * \left[ \frac{1}{2} + \frac{1}{\sqrt{\pi}} \int_0^x e^{\frac{(t-\mu)^2}{2\sigma^2}} dt \right] \quad \text{(E1)}$$

where an average value $\mu$ is represented "$x_c+(W_{im}/2)$", a standard deviation $\sigma$ is represented "$W_{im}/6$", Add is an additional power, x is a radial distance of the first optical region 108 based on the optical axis 102, $P_c$ is the near vision power or distance vision power of the central zone 110, $x_c$ is a radius of the central zone 110, $W_m$ is a width of the intermediate zone 114, t is an integral variable of a length, and an operator "+" represents that the central zone 110 is the distance vision power and an operator "−" represents that the central zone 110 is the near vision power. In one embodiment, Add is computed by the difference between maximum value and minimum value in FIG. 3. For example, Add is computed by expression: −0.5−(−3.0)=2.5 D.

As shown in FIG. 3, the radial distance of the central zone 110, the width of the intermediate zone 114 and the Add of the first optical region 108 are configured to adjust the power of continuity normal distribution in the first optical region 108. Specifically, the profile and the changing rate of the power curve can be controlled and adjusted by the radius $x_c$ of central zone 110, the width $W_{im}$ of the intermediate zone 114 and the Add to be suitable for the shape and size of the wearer's pupil. For example, the size of the pupil has a range from 2 mm to 6 mm. In one preferred embodiment, the radius $x_c$ of the central zone is greater than or equal to zero millimeter (mm) and the radius $x_c$ is less than one mm, the width $W_{im}$ of the central zone is greater than zero mm and the width $W_{im}$ is less than or equal to three mm. Therefore, the present invention can increase the deign flexibility of the contact lens.

Figure 4:
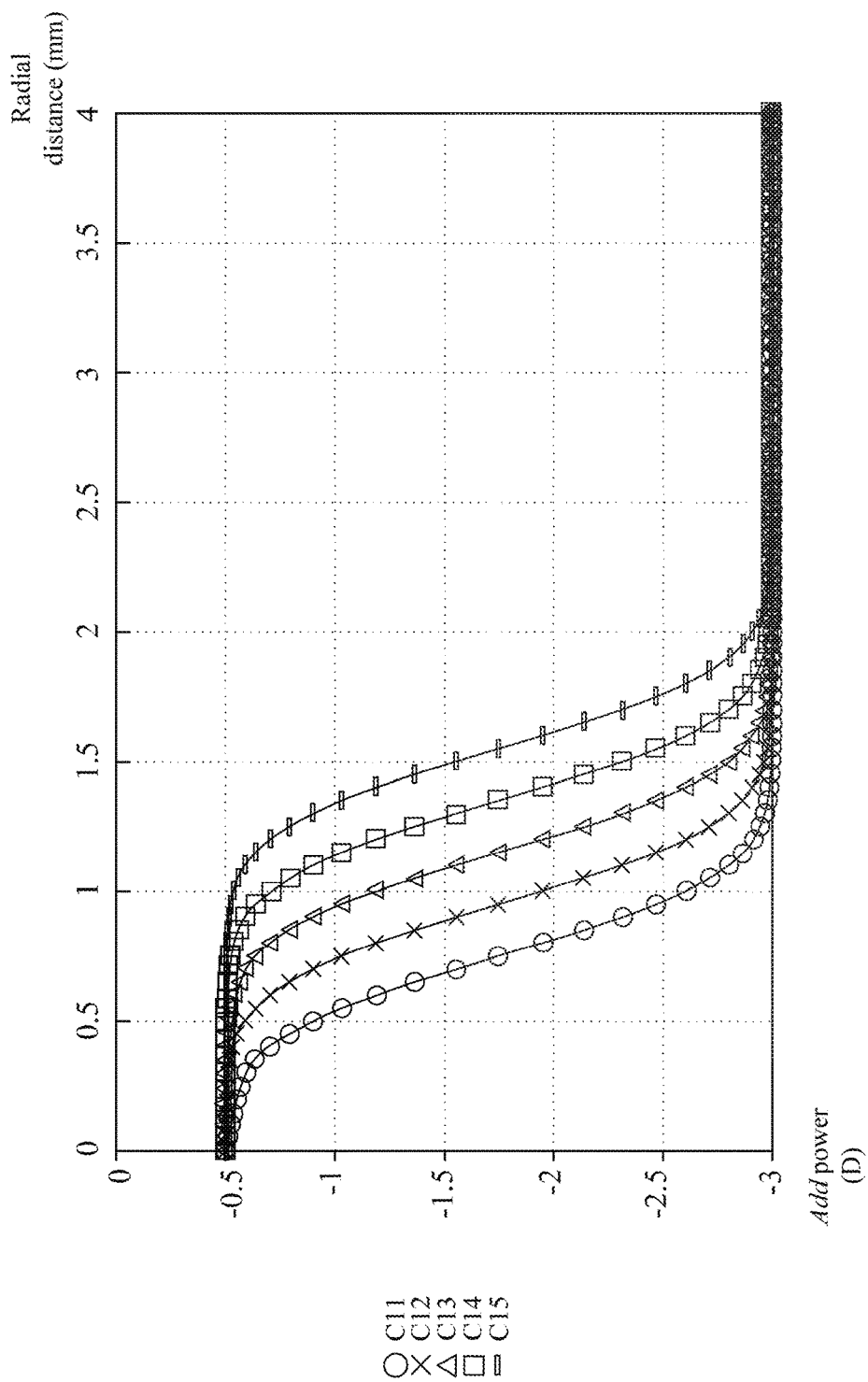
FIG. 4 is a schematic view of a plurality of add power curves of a central zone which is configured to be different radii and a near vision power according to one embodiment of the present invention.

FIG. 4 is a schematic view of a plurality of add power curves of a central zone 110 which is configured to be different radii and a near vision power according to one embodiment of the present invention. In FIG. 4, the add power curves are represented by following formula:

$$(x) = P_c - \text{Add} * \left[ \frac{1}{2} + \frac{1}{\sqrt{\pi}} \int_0^x e^{\frac{(t-\mu)^2}{2\sigma^2}} dt \right] \quad \text{(E1a)}$$

where $P_c$ is the near vision power of the central zone 110.

In one embodiment of FIG. 4, $P_c$ is −0.5 D, $W_{im}$ is 1.5 mm, and Add is 2.5 D, radius $x_c$ is 0.0, 0.2, 0.4, 0.6 and 0.8 mm respectively corresponding to the power curves C11 to C15. The first optical region 108 of the front side surface 104 from the center zone 110 to the annular zone 112 via the intermediate zone 114 can effectively form a plurality of smooth and continuous power curves.

Figure 5:
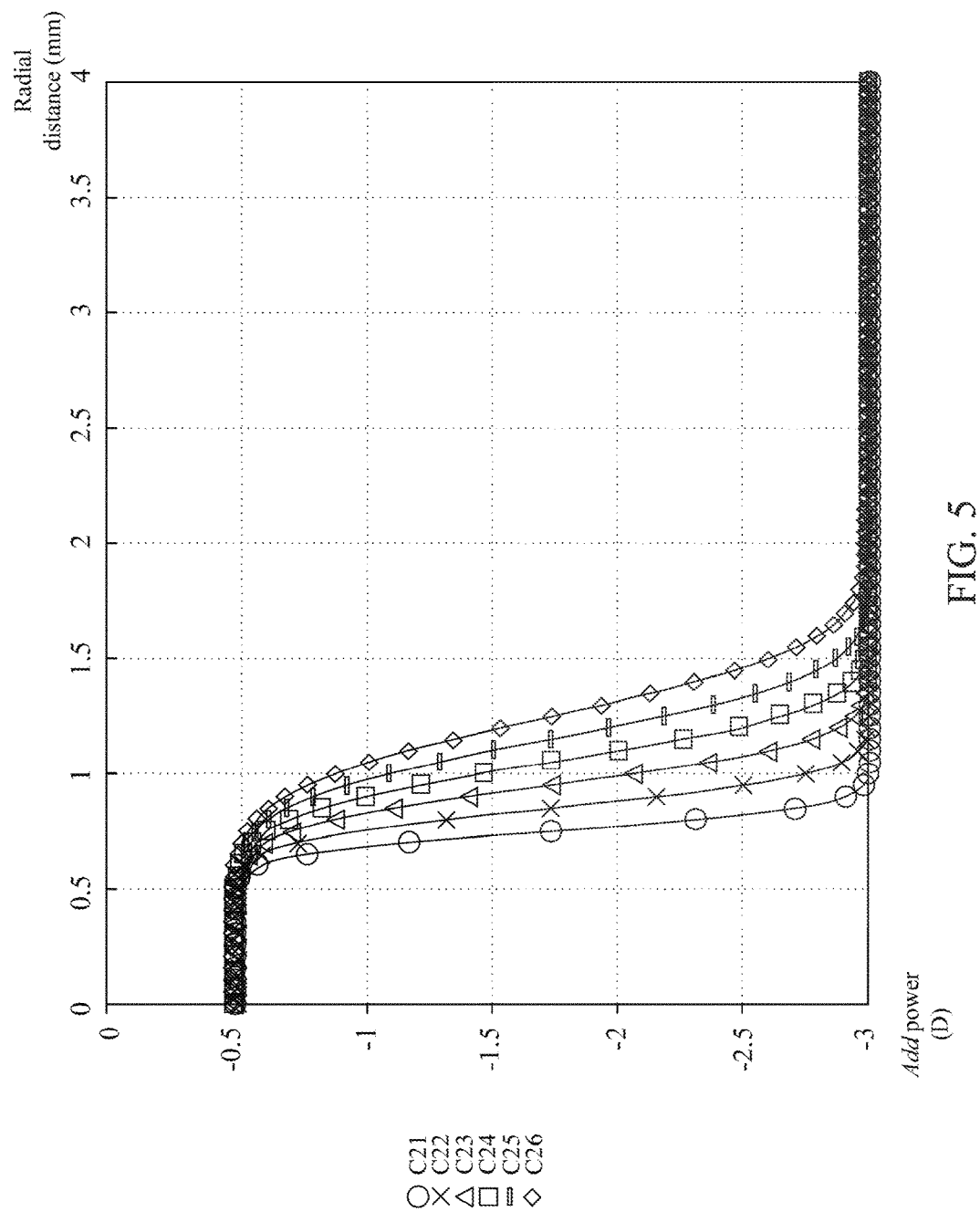
FIG. 5 is a schematic view of a plurality of add power curves of an annular zone having different widths and a central zone which is configured to be a near vision power according to one embodiment of the present invention.

FIG. 5 is a schematic view of a plurality of add power curves of an annular zone 112 having different widths and a central zone 110 which is configured to be a near vision power according to one embodiment of the present invention. Referring to formula (E1a), $P_c$ is −0.5 D, radius $x_c$ is 0.6 mm, Add is 2.5 D, $W_{im}$ is 0.5, 0.7, 0.9, 1.1, 1.3 and 1.5 mm respectively corresponding to the power curves C21 to C26. The first optical region 108 of the front side surface 104 from the center zone 110 to the annular zone 112 via the intermediate zone 114 can effectively form a plurality of smooth and continuous power curves.

Figure 6:
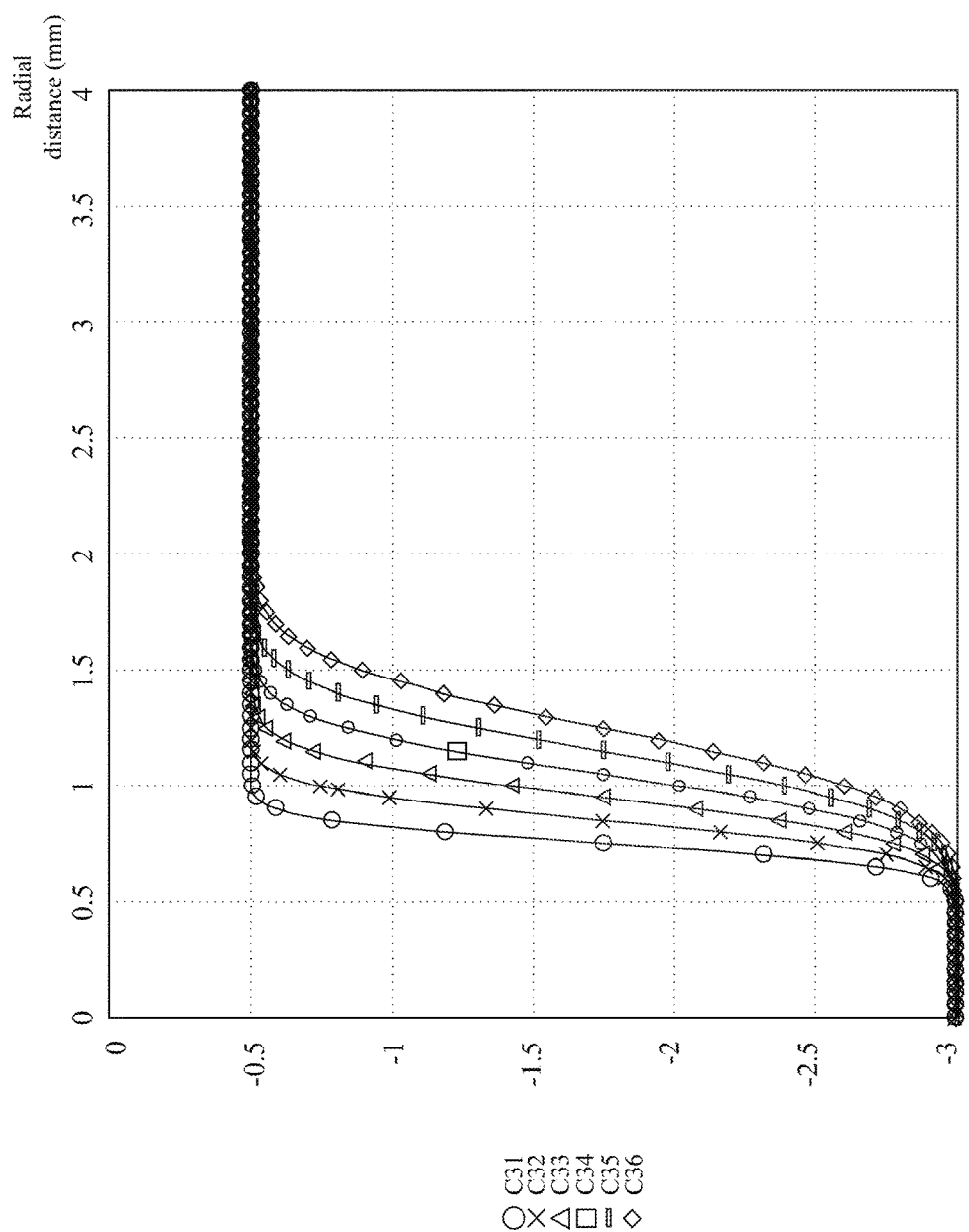
FIG. 6 is a schematic view of a plurality of add power curves of an annular zone having different widths and a central zone which is configured to be a distance vision power according to one embodiment of the present invention.

FIG. 6 is a schematic view of a plurality of add power curves of an annular zone 112 having different widths and a central zone 110 which is configured to be a distance vision power according to one embodiment of the present invention. In FIG. 6, the add power curves are represented by following formula:

$$(x) = P_c + \text{Add} * \left[ \frac{1}{2} + \frac{1}{\sqrt{\pi}} \int_0^x e^{\frac{(t-\mu)^2}{2\sigma^2}} dt \right] \quad \text{(E1b)}$$

where $P_c$ is the distance vision power of the central zone 110.

In one embodiment of FIG. 6, $P_c$ is −3.0 D, radius $x_c$ is 0.6 mm, Add is 2.5 D, $W_{im}$ is 0.5, 0.7, 0.9, 1.1, 1.3 and 1.5 mm respectively corresponding to the power curves C31 to C36. If $W_{im}$ is increased, the changing rate of the power of the profile is more smooth. In the power curves of this embodiment, the first optical region 108 of the front side surface 104 from the center zone 110 to the annular zone 112 via the intermediate zone 114 can effectively form a plurality of smooth and continuous power curves.

Figure 7:
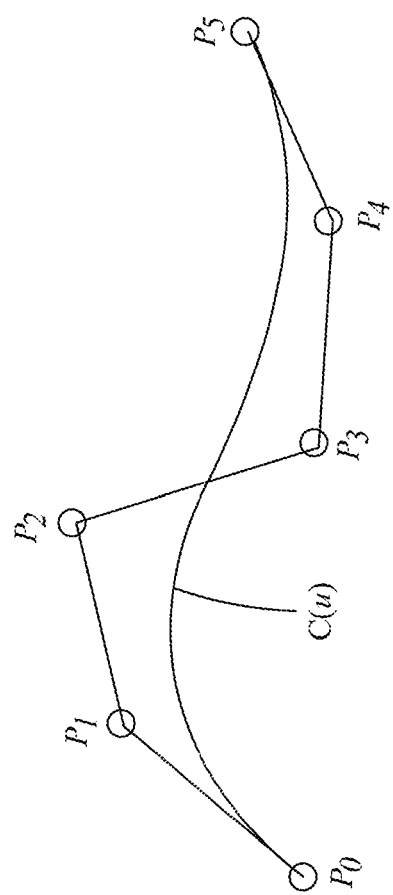
FIG. 7 is a schematic view of a non-uniform rational B-spline (NURBS) of the progressive multifocal contact lens according to one embodiment of the present invention.

FIG. 7 is a schematic view of a non-uniform rational B-spline (NURBS) of the progressive multifocal contact lens according to one embodiment of the present invention. In FIG. 7, the continuous surface profile of NURBS C(u) is represented by following formula:

$$C(u) = \frac{\sum_{i=0}^{h} N_{i,p}(u) w_i P_i}{\sum_{i=0}^{h} N_{i,p}(u) w_i} \quad \text{(E2)}$$

where $P_i$ is i-th control point of total (h+1) control points, $w_i$ is i-th weighting value, $N_{i,p}(u)$ is i-th B-spline basis function of parameter u and degree p.

The node vector U is represented by the following formula:

$$U = \{\underbrace{0, \ldots, 0}_{p+1}, u_{p=2}, \ldots, u_{h+1}, \underbrace{1, \ldots, 1}_{p+1}\} \quad \text{(E21)}$$

The i-th B-spline having order p is a polynomial function represented by the following formula:

$$N_{i,0}(u) = 1, \text{ if } u_i \le u \le u_{i+1}, \text{ otherwise } N_{i,0}(u) = 0 \quad \text{(E22)}$$

$$N_{i,p}(u) = \frac{u - u_i}{u_{i+p} - u_i} N_{i,p-1}(u) + \frac{u_{i+p+1} - u}{u_{i+p+1} - u_{i+1}} N_{i+1,p-1}(u) \quad \text{(E23)}$$

The curvature of the points on the NURBS is represented by the following formula:

$$k = \frac{|C'(u) \times C''(u)|}{|C'(u)|^3} \quad \text{(E24)}$$

The curvature radius of the arbitrary point is represented by R=(1/k) so that the curvature radius R can be adjusted to form the continuous surface of the NURBS.

In one embodiment of the progressive multifocal contact lens, the center zone 110, the annular zone 112 and the intermediate zone 114 of the first optical region 108 are formed by the continuous surface of the NURBS. In another embodiment, each connection point of the center zone 110 and the intermediate zone 114 of the first optical region 108 have the same curvature value to construct the continuous surface of the first optical region 108 in the front side surface 104, as shown in FIG. 1 and FIG. 2 and the power curves depicted in the FIG. 3.

Figure 8A:
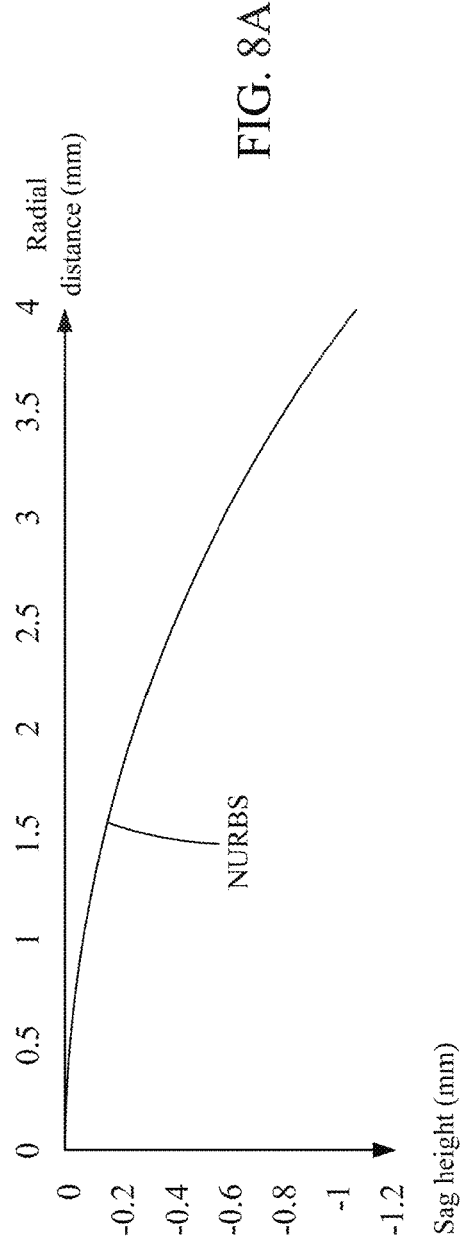
FIGS. 8A-8B are schematic views of a non-uniform rational B-spline (NURBS) of the first optical region of the progressive multifocal contact lens and a corresponding add power curve according to one embodiment of the present invention.
Figure 8B:
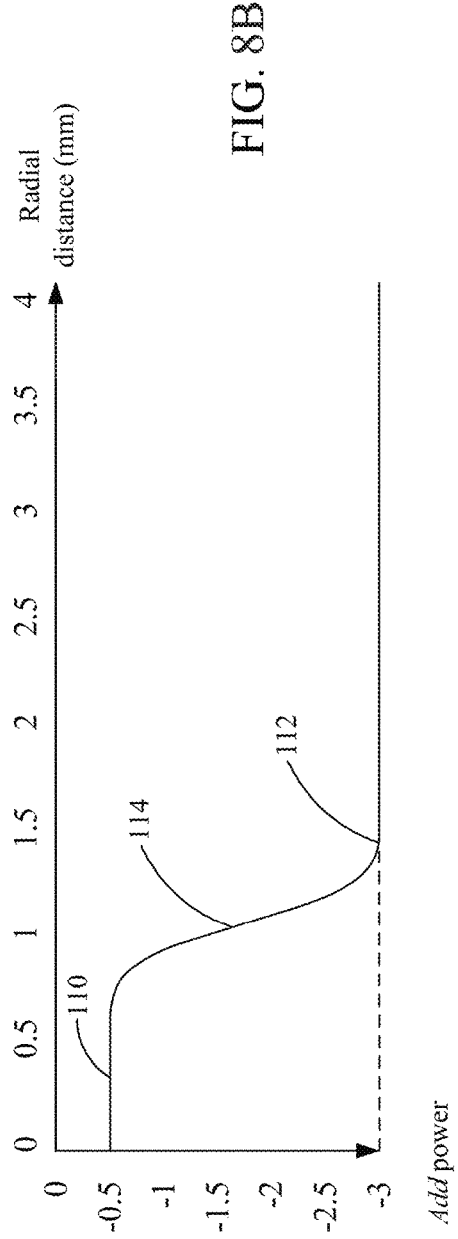

FIGS. 8A-8B are schematic views of a non-uniform rational B-spline (NURBS) of the first optical region 108 of the progressive multifocal contact lens and a corresponding add power curve according to one embodiment of the present invention. In FIG. 8A, a horizontal axis is defined as x which is a radial distance of the first optical region 108. A vertical axis is defined as a sag height (mm). The horizontal axis and vertical axis in FIG. 8B are the same as those in FIG. 3. The NURBS in FIG. 8A forms the center zone 108, annular zone 112 and the intermediate zone 114 of the first optical region 108 in FIG. 1, which corresponds to the add power curves so that continuous profile and progressive changing rate of the power of NURBS on the front side surface to improve the eyesight of the wearer and increase the deign flexibility of the contact lens.

Figure 9:
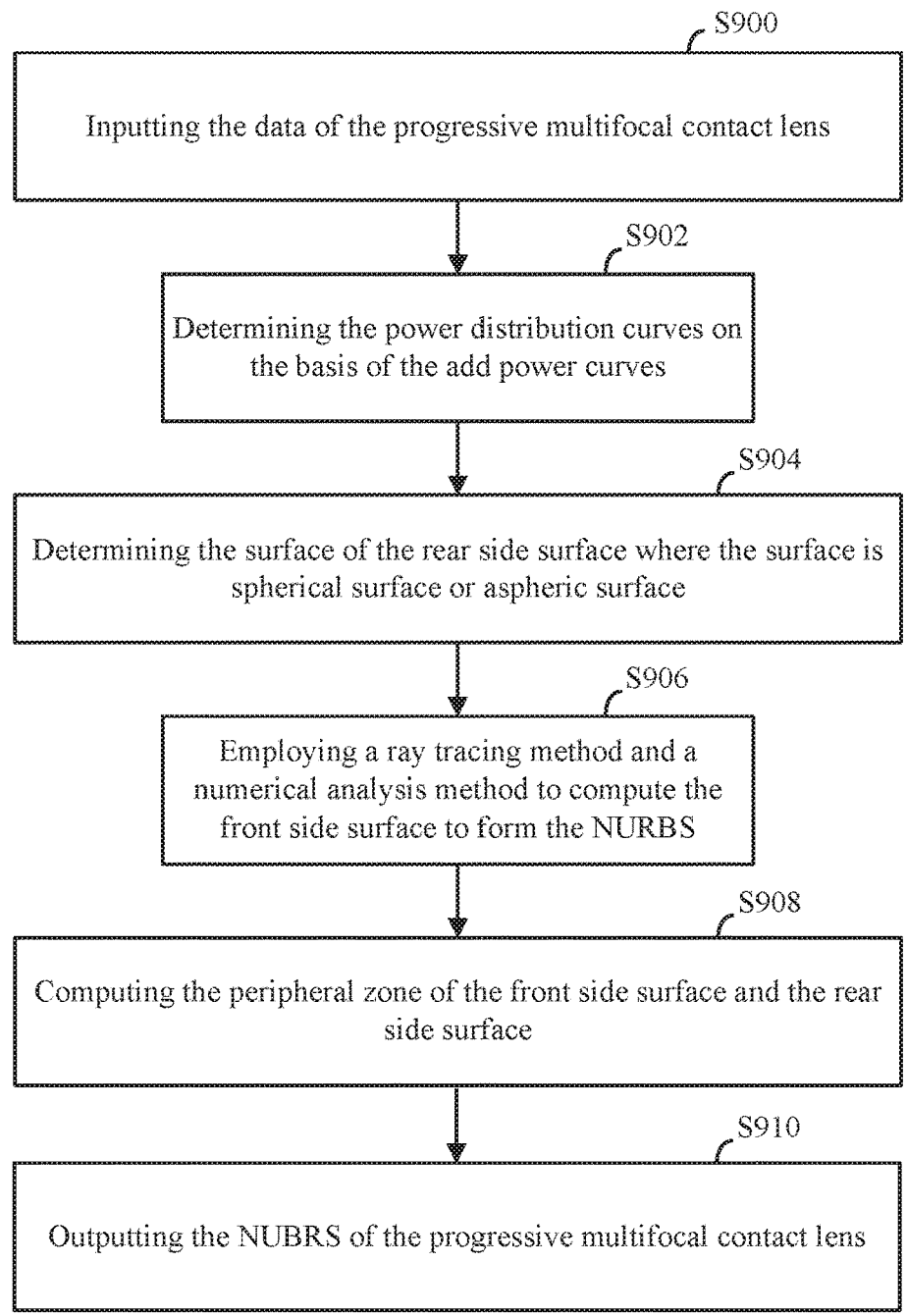
FIG. 9 is a flow chart of a method of producing the progressive multifocal contact lens according to one embodiment of the present invention.

Please refer to FIG. 1 to FIG. 4 and FIG. 9. FIG. 9 is a flow chart of a method of producing the progressive multifocal contact lens according to one embodiment of the present invention.

In step S900, the data of the progressive multifocal contact lens is inputted where the data includes the cornea shape of the wearer, the distance vision power, near vision power, material of the contact lens (e.g., soft or hard material), a diameter of the optical region and the thickness of the contact lens. An optical axis 102 is provided to a main body 100.

In step S902, the power distribution curves are determined on the basis of the add power curves of the formulas (E1a) and (E1b).

In step S904, the surface of the rear side surface 106 is determined, where the surface is spherical surface or aspheric surface. Specifically, a rear side surface 106 having a second optical region 116 is formed, where the optical axis 102 is a center of the second optical region 116, and an edge portion 104a of the front rear side surface 104 is connected to an edge portion 106a of the rear side surface 106.

In step S906, a ray tracing method and a numerical analysis method are used to compute the front side surface 104 to form the NURBS. In one embodiment, the radius of each point on the front side surface 104 satisfies the add power curves of formulas (E1a) and (E1b). Furthermore, the formulas (E2), (E21), (E22), and (E23) are configured to form the NURBS. Specifically, before the step of forming a front side surface 104 having a first optical region 108, the optical axis 102 is defined as a center of the first optical region 108, where the first optical region 108 near the optical axis 102 includes a central zone 110, an annular zone 112, and an intermediate zone 114 disposed between the central zone 110 and the annular zone 114, and the central zone 110 and the annular zone 112 includes different powers having a distance vision power and a near vision power respectively. Afterwards, the intermediate zone 114 is adjusted to change an optical power of the distance vision power and the near vision power progressively so that a power between the distance vision power and the near vision power in the first optical region 108 of the front side surface 104 forms a continuity normal distribution. The center zone 110, annular zone 112 and the intermediate zone 114 of the first optical region 108 are continuous surface of the NURBS.

In step S908, the peripheral zone 115 of the front side surface 104 and the rear side surface are computed to fit the comfort of the wearer.

In step S910, NUBRS of the progressive multifocal contact lens is outputted. For example, computer aids design (CAD) model and computer numeric control (CNC) method are used to produce the progressive multifocal contact lens with the NUBRS. In one embodiment, the method of producing a progressive multifocal contact lens is performed by a processor to execute software program stored in memory (e.g., non-volatile memory, RAM and/or ROM). Moreover, the processed data or processing data of the progressive multifocal contact lens and parameters can be stored in the memory so that the computer programs can be executed to complete the above-mentioned steps.

According to the aforementioned descriptions, the present invention provide a progressive multifocal contact lens and a producing method thereof by forming a non-uniform rational B-spline (NURBS) profile on the front side surface and allocating a progressive changeable power to improve the eyesight of the wearer and increase the deign flexibility of the contact lens. The present invention utilizes NURBS to form the surface profile of the front side surface so that the corresponding focal length by near portion and distance portion to change the power associated with optical power. Moreover, the progressive multifocal contact lens has high design flexibility for the optical power distribution to fit the requirement of presbyopia of the wearer, where the NURBS is used to improve the smooth and continuous surface and satisfy different powers associated with optical power distribution and add power.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A progressive multifocal contact lens, comprising:
   an optical axis;
   a front side surface having a first optical region, wherein the optical axis is a center of the first optical region, the first optical region near the optical axis comprises a central zone, an annular zone, and an intermediate zone disposed between the central zone and the annular zone, the central zone and the annular zone comprise different powers having a distance vision power and a near vision power respectively, and the intermediate zone is configured to adjust an optical power of the distance vision power and the near vision power progressively so that a power between the distance vision power and the near vision power in the first optical region of the front side surface forms a normal cumulative distribution function; and
   a rear side surface having a second optical region, wherein the optical axis is a center of the second optical region, the rear side surface is disposed opposite the front side surface based on the optical axis, and an edge portion of the front rear side surface is connected to an edge portion of the rear side surface;

wherein the powers are represented by following formula:

$$(x) = P_c \pm \text{Add} * \left[ \frac{1}{2} + \frac{1}{\sqrt{\pi}} \int_0^x e^{\frac{(t-\mu)^2}{2\sigma^2}} dt \right]$$

where an average number μ is represented "$x_c+(W_{im}/2)$", a standard deviation σ is represented "$W_{im}/6$", Add is an additional power, x is a radial distance of the first optical region based on the optical axis, $P_c$ is the near vision power or distance vision power of the central zone, $x_c$ is a radius of the central zone, $W_{im}$ is a width of the intermediate zone, t is an integral variable of a length, and an operator "+" represents that the central zone is the distance vision power and an operator "−" represents that the central zone is the near vision power.

2. The progressive multifocal contact lens of claim 1, wherein the front side surface further comprises a peripheral zone connected to an outer edge portion of the annular zone and the peripheral zone is either spherical surface or aspheric surface.

3. The progressive multifocal contact lens of claim 1, wherein the radius $x_c$ of the central zone is greater than or equal to zero millimeter (mm) and the radius $x_c$ is less than one mm, the width $W_{im}$ of the central zone is greater than zero mm and the width $W_{im}$ is less than or equal to three mm.

4. The progressive multifocal contact lens of claim 1, wherein either the central zone is the distance vision power and the annular zone is the near vision power or the central zone is the near vision power and the annular zone is the distance vision power.

5. The progressive multifocal contact lens of claim 1, wherein a radius of the central zone, a width of the intermediate zone and an add power of the first optical region are configured to adjust the continuity normal distribution of the powers of the first optical region.

6. The progressive multifocal contact lens of claim 1, wherein the central zone, the annular zone, and the intermediate zone of the first optical region are a continuous surface profile of a non-uniform rational B-spline (NURBS).

7. The progressive multifocal contact lens of claim 6, wherein the continuous surface profile of NURBS is represented by following formula:

$$C(u) = \frac{\sum_{i=0}^{h} N_{i,p}(u) w_i P_i}{\sum_{i=0}^{h} N_{i,p}(u) w_i}$$

where $P_i$ is i-th control point of total (h+1) control points, $w_i$ is i-th weighting value, $N_{i,p}(u)$ is i-th B-spline basis function of parameter u and degree p.

8. The progressive multifocal contact lens of claim 1, wherein each connection point of the central zone and the intermediate zone of the first optical region comprises the same slope value, and each connection point of the intermediate zone and the annular zone comprises the same slope value.

9. The method of producing a progressive multifocal contact lens 1, wherein each connection point of the central zone and the intermediate zone of the first optical region comprises the same curvature value, and each connection point of the intermediate zone and the annular zone comprises the same curvature value.

10. A method of producing a progressive multifocal contact lens, the method comprising:
providing an optical axis to a main body;
forming a front side surface having a first optical region, wherein the optical axis is a center of the first optical region, the first optical region near the optical axis comprises a central zone, an annular zone, and an intermediate zone disposed between the central zone and the annular zone, the central zone and the annular zone comprise different powers having a distance vision power and a near vision power respectively;
adjusting the intermediate zone to change an optical power of the distance vision power and the near vision power progressively so that a power between the distance vision power and the near vision power in the first optical region of the front side surface forms a continuity normal distribution; and
forming a rear side surface having a second optical region, wherein the optical axis is a center of the second optical region, and an edge portion of the front rear side surface is connected to an edge portion of the rear side surface;
wherein the powers are represented by following formula:

$$(x) = P_c \pm \text{Add} * \left[ \frac{1}{2} + \frac{1}{\sqrt{\pi}} \int_0^x e^{\frac{(t-\mu)^2}{2\sigma^2}} dt \right]$$

where an average number μ is represented "$x_c+(W_{im}/2)$", a standard deviation σ is represented "$W_{im}/6$", Add is an additional power, x is a radial distance of the first optical region based on the optical axis, $P_c$ is the near vision power or distance vision power of the central zone, $x_c$ is a radius of the central zone, $W_{im}$ is a width of the intermediate zone, t is an integral variable of a length, and an operator "+" represents that the central zone is the distance vision power and an operator "−" represents that the central zone is the near vision power.

11. The method of producing a progressive multifocal contact lens of claim 10, wherein the front side surface further comprises a peripheral zone connected to an outer edge portion of the annular zone and the peripheral zone is either spherical surface or aspheric surface.

12. The method of producing a progressive multifocal contact lens of claim 10, wherein the radius $x_c$ of the central zone is greater than or equal to zero millimeter (mm) and the radius $x_c$ is less than one mm, the width $W_{im}$ of the central zone is greater than zero mm and the width $W_{im}$ is less than or equal to three mm.

13. The method of producing a progressive multifocal contact lens of claim 10, wherein either the central zone is the distance vision power and the annular zone is the near vision power or the central zone is the near vision power and the annular zone is the distance vision power.

14. The method of producing a progressive multifocal contact lens of claim 10, wherein a radius of the central zone, a width of the intermediate zone and an add power of the first optical region are configured to adjust the continuity normal distribution of the powers of the first optical region.

15. The method of producing a progressive multifocal contact lens of claim 10, wherein the central zone, the annular zone, and the intermediate zone of the first optical region are a continuous surface profile of a non-uniform rational B-spline (NURBS).

16. The method of producing a progressive multifocal contact lens of claim 15, wherein the continuous surface profile of NURBS is represented by following formula:

$$C(u) = \frac{\sum_{i=0}^{h} N_{i,p}(u) w_i P_i}{\sum_{i=0}^{h} N_{i,p}(u) w_i}$$

where $P_i$ is i-th control point of total (h+1) control points, $w_i$ is i-th weighting value, $N_{i,p}(u)$ is i-th B-spline basis function of parameter u and degree p.

* * * * *